United States Patent [19]

Rennes et al.

[11] 4,094,700
[45] June 13, 1978

[54] APPARATUS AND PROCESS FOR THE PRODUCTION OF GLUTEN AND STARCH FROM WHEAT, RYE, OR BARLEY

[75] Inventors: Harri Rennes, Raisio, Finland; Christian Lippuner, Niederuzwil, Switzerland

[73] Assignees: Gebrueder Buehler AG, Uzwil, Switzerland; Oy Vehna AB, Raisio, Finland; part interest to each

[21] Appl. No.: 724,839

[22] Filed: Sep. 20, 1976

[30] Foreign Application Priority Data

Sep. 23, 1975   Switzerland.......................... 12347/75

[51] Int. Cl.$^2$ .............................................. C13L 1/02
[52] U.S. Cl. ........................................ 127/24; 127/65; 127/67
[58] Field of Search ..................... 127/24, 25, 65, 67, 127/68, 69; 260/112 R

[56] References Cited

U.S. PATENT DOCUMENTS

| | | | |
|---|---|---|---|
| 2,097,531 | 11/1937 | Peltzer | 127/24 X |
| 2,100,744 | 11/1937 | Kelling | 127/24 X |
| 2,105,217 | 1/1938 | Kelling | 127/24 X |
| 2,517,149 | 8/1950 | Walsh | 127/24 |
| 2,573,048 | 10/1951 | Newkirk | 127/68 |
| 2,689,810 | 9/1954 | Vegter | 127/24 X |
| 3,597,274 | 8/1971 | Gillenwater | 127/68 |
| 3,930,878 | 1/1976 | Mendoza | 127/67 |
| 3,951,938 | 4/1976 | Kerkkonen | 127/67 X |

Primary Examiner—Sidney Marantz
Attorney, Agent, or Firm—Merchant, Gould, Smith, Edell, Welter & Schmidt

[57] ABSTRACT

Apparatus and method for producing gluten and starch from a dispersion of wheat, barley or rye endosperm fractions in water. The raw grain is initially milled to produce endosperm fractions suitable for carrying out the subsequent steps of the process. The steps taken in the milling process include breaking the raw grain between a series of fluted rollers, sorting the bran from various grades of semolinas, sizing coarse semolinas by the cutting action of fluted, opposed rollers, pressing and impacting coarse and fine semolinas by a series of smooth, opposed rollers and dissipaters, and finally reducing the tailing from the pressing and impacting steps in a series of smooth or fluted rollers, and dissipaters.

22 Claims, 2 Drawing Figures

APPARATUS AND PROCESS FOR THE PRODUCTION OF GLUTEN AND STARCH FROM WHEAT, RYE, OR BARLEY

BACKGROUND OF THE INVENTION

1. Field of the Invention

This invention relates to a method for the production of gluten and starch from wheat, rye or barley. More particularly this invention relates to the grain milling step of the method wherein suitable endosperm fractions are produced from the raw grain.

2. Description of the Prior Art

The invention relates to a method for the production of starch and gluten from wheat, rye, or barley, whereby endosperm fractions from the milling are dispersed in water and the dispersion is separated, by centrifuging, into a heavy fraction rich in starch and a light fraction which is rich in gluten, and whereby the light fraction is treated at an elevated temperature until the gluten forms filiform agglomerates, and these agglomerates are then enlarged by the addition of water and by intensive processing of the liquid mixture.

A process of this kind offers considerable advantages as compared to conventional methods where a dough or paste is made. It requires little time, there are no losses in dry substance, and water consumption is much less. As compared to more recent methods without dough or paste production, there is the advantage of a higher yield in gluten. The purity and the quality of this gluten are considerably better than heretofore.

This method was set forth in the German disclosure DT-OS No. 2,345,129.

SUMMARY OF THE INVENTION

As already mentioned, there are considerable advantages in this process as compared to the methods used up to the present time. The economics of its industrial application remains one of the principal questions.

Therefore, the objective is to carry out a process of the type initially mentioned in a still more economical manner. This ovjective is achieved in accordance with the present invention in that the endosperm products from the grinding process are milled, with a modification of the conventional wheat milling flow chart while retaining the usual machines which are known to be reliable for the purpose. The product from this milling operation differs from that of conventional flour production methods. Operations are carried out in accordance with the process mentioned initially for obtaining starch and gluten.

The invention achieves a considerable improvement over the known process in a surprising manner, in that the yields of starch and gluten are increased and the quality of the products improved.

The process in accordance with the present invention is characterized in that the wheat, or the rye or barley, is ground in a mill having a plurality of passages, each comprising at least one pair of rollers and a sifting apparatus, for example, a plan sifter, the wheat, rye or barley being broken up in a conventional break-system having a plurality of passages and also, depending upon output, possibly with grading plan sifters and possibly with brushing machines or bran centrifuges depending on yields requirements, in that the semolinas are sized in passages with fluted rollers, in that the sized products and the fine products from the break passages are further ground through pressing and impacting passages which each include a roller pair with smooth rollers, with a small speed ratio between the fast roller and the slow roller, and also comprise an impact-dissipater or a beater-dissipater and in that the not yet finished products in these pressing and impacting passages are subjected to final reduction in a small number of conventional final reduction passages using smooth or possibly fine-fluted rollers.

There are fewer passages as compared with a mill for producing baking flour, which results in a simpler installation.

In a further development of the idea of the invention, the product obtained at each passage is passed through a sieving cloth with the same mesh aperture in each case. Thus, the product has a relatively uniform granulation that is maintained within narrow limits. This measure has proved to be economically advantageous in the process proposed by the present invention.

The invention further concerns a mill for carrying out the aforementioned process proposed by the present invention, using a conventional break-system and a reduction system which display a plurality of passages, each with at least one pair of rollers and a sifting apparatus, for example a plan sifter, the pairs of rollers of the break-system consisting of fluted rollers with a usual value for the speed ratio between the slow roller and the fast roller of for example 1:2.5, and this break-system being provided if appropriate, with a plurality of brushing machines and/or bran centrifuges and, if necessary, with one or more grading plan sifters.

This mill is characterized in that the reduction system consists of three groups of passages arranged one behind the other, namely:

a sizing group whose passages are provided with pairs of fluted rollers for semolina reduction, with a speed ratio that is in the range between 1:1.3 and 1:1.8, a pressing and impacting group whose passages are provided with pairs of smooth rollers, whose speed ratio is in the range between 1:1.0 and 1:1.2, an impact-dissipater or a beater-dissipater being arranged in each case between the pair of rollers and the plan sifter;

and final reduction group whose passages are provided with pairs of smooth rollers or, if appropriate, pairs of fine-fluted rollers, whose speed ratio is in the range between 1:1.2 and 1:1.4, and impact-dissipaters or beater-dissipaters can be provided at individual passages.

By dividing the reduction system into three different groups of passages an optimum method of operation is ensured, which makes it possible to manage with a very small overall number of passages, and provides a grinding process which does not impair the product, thanks to the different actions of the individual groups.

The various kinds of grinding methods used in the reduction system are already known, but heretofore it has never been considered that all three methods could be used together and systematically.

BRIEF DESCRIPTION OF THE DRAWINGS

The drawing shows schematically, by way of example, the block diagram of an installation for carrying out the process, and in these drawings.

DESCRIPTION OF THE PREFERRED EMBODIMENT

Figure 1:
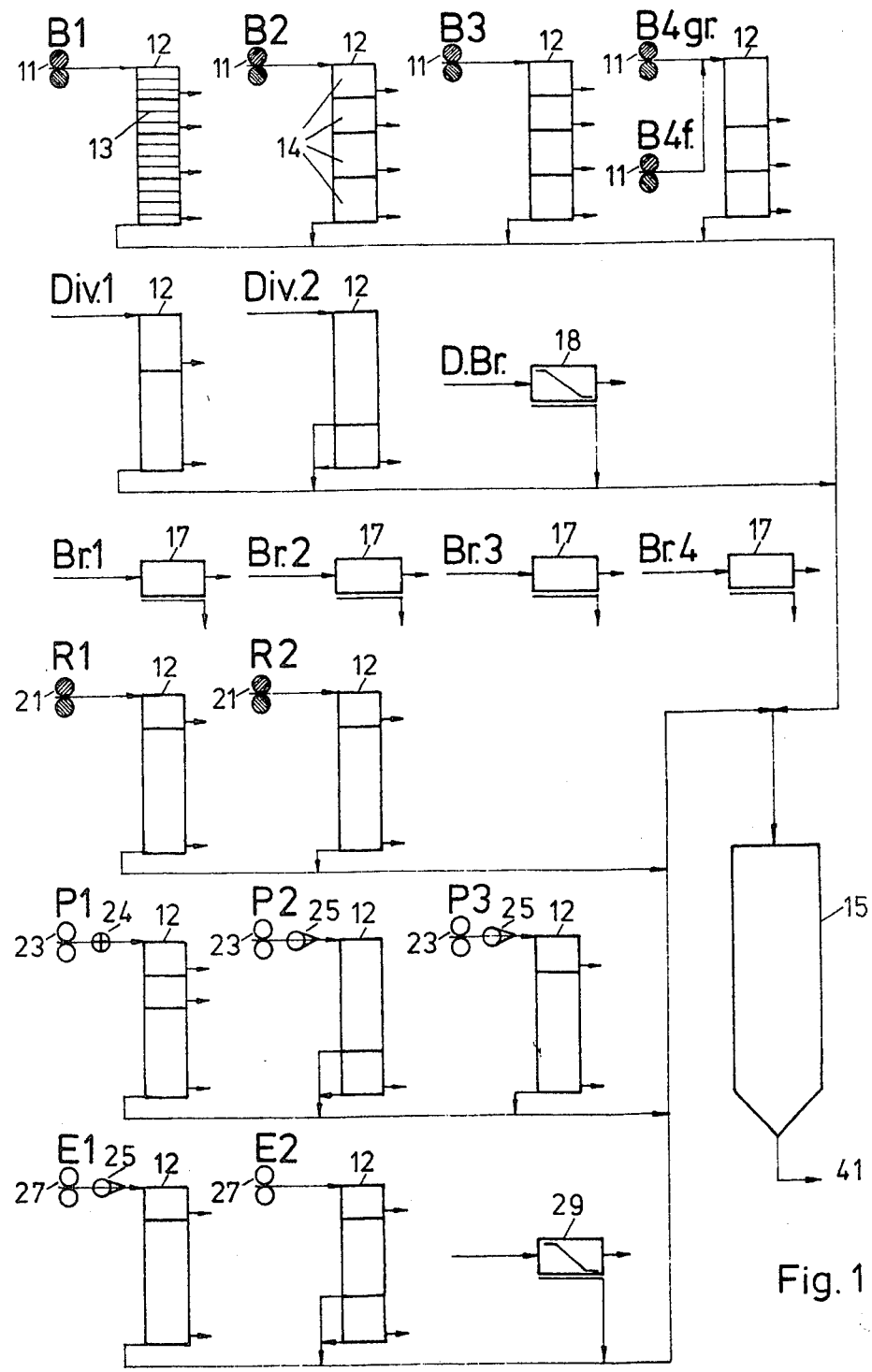
FIG. 1 shows the mill.

The mill (FIG. 1) has a conventional break-system including four break passages, B1, B2, B3, B4. Each passage comprises a pair of fluted rollers 11 and a sifting unit constructed as a plan sifter compartment 12. As is known, the fineness of the fluting increases from one stage to another. The speed ratio between the slow roller and the fast roller amounts in each case to 1:2.5, i.e., a conventional value. The fourth break passage B4 is divided into coarse and fine fractions which are supplied separately to a pair of fluted rollers 11 B4 *gr* for coarse breaks and 11 B4 *f* for fine breaks. The plan sifter compartments 12 each include a stack of sieves 13. The sieves 13 of a stack are provided with sieving cloths of different mesh aperture. Plan sifter compartments of a plurality of passages of the mill are combined with a single drive to constitute a plan sifter which carries out the desired sifting movement, i.e., a circular horizontal translational movement. Instead of plan sifters it would also be possible to use forced-action sifters, for example sifting drums.

The size and number of the flutes of the pairs of rollers 11, the mesh aperture of the individual sieving cloths in the plan sifter compartments 12, the flow of the products within these plan sifter compartments 12 and from one passage to another are arranged in accordance with the usual rules of the milling art and depend upon the grain which enters the process and on climatic conditions. Their layout can be left to the head miller of the mill in question and the same applies to the other passages and machines of the mill.

In one plan sifter compartment 12 there is shown the division of the stack or sieves into groups 14 of sieves having the same mesh aperture. Arrows indicate, on the one hand, the feed direction and, on the other hand, the sieve tailings going to further passages of the mill, or the sieve siftings, i.e., finish-ground products, which are intended for further use in the installation for separating starch and gluten.

In each plan sifter compartment 12 throughout the mill, a product is obtained which in each case has passed through sieving cloths having the same mesh aperture. In a mill for the production of baking flour it is usual to use different sieving cloths. The products which are thus obtained from all passages of the mill are conveyed in common to a storage bin 15 and fed from there to the installation provided for the separation of starch and gluten, according to need.

To prolong the sifting carried out in the break passages the as yet not completely sifted products from the plan sifters 12 B1 and B2 are fed to a further plan sifter compartment (grader) 12 Div. 1 for sorting, while the coarse semolinas are fed directly to the front passages of the reduction system. The products which are not yet finished sifted from the plan sifter compartment 12 B3 are fed to a further plan sifter compartment (grader) 12 Div. 2.

Brans of various sizes from the plan sifter 12 B4 are fed to the bran brushes 17 B*r* 1, 17 B*r* 2, 17 B*r* 3, 17 B*r* 4 to increase the yield in endosperm fractions from these brush machines. The bran is discharged as a finished product. The sifted products are fed to a turbosifter 18 DB*r* for screening. The tailings from this are fed to the plan sifter compartment 12 Div. 2 and the siftings to the storage bin 15. Instead of bran brushes 17 it would also be possible to use bran centrifuges.

The reduction system consists of three groups of passages arranged in series, one behind the other. The first group is a sizing group with two passages R1 and R2.

These passages each comprise a pair of fluted rollers 21 with a speed ratio of 1:1.5 and a plan sifter compartment 12. This ratio could be selected from the range between 1:1.3 and 1:1.8. The pair of fluted rollers 21 R1 are fed with coarse semolinas from the plan sifters 12 B1, 12 B2 and 12 Div. 1. Relatively fine semolinas from the plan sifter 12 Div. 1 and 15 R1 are fed to the pair of fluted rollers 21 R2. The fragmentation effected in the stages R1, R2 is achieved by a cutting action, which means that the products are treated gently.

The second group of the reduction system is a pressing and impacting group whose three passages P1, P2, P3 are each provided with a pair of smooth rollers 23, an impact-dissipater 24 or a beater-dissipater 25 respectively, and a plan sifter compartment 12. The speed ratio of the pairs of smooth rollers is 1:1.05. It could be selected from the range 1:1.00 to 1:1.20. The passages P1, P2 and P3 are each supplied with semolina products from one or more of the preceding passages. Owing to the small speed ratio, the pair of smooth rollers 23 press these semolina products without friction. Thus, the individual particles are weakened along their natural line of fracture and thus taken apart along this line of fracture in the impact-dissipater 24 or the beater-dissipater 25 of the same passage. Dissipaters are also known under the names detachers or flake-disrupters.

Again a gentle fragmentation is achieved. The wheat germs are taken as a finished product from the plan sifter 12 P1 at the arrow 26.

The third group of the reduction system is a final reduction group whose two passages E1, E2 are provided with pairs of smooth rollers 27 whose speed ratio is 1:1.25. This ratio can be selected from the range between 1:1.2 and 1:1.4. Plan sifters 12 are also provided. The passage E1 is provided with a beater-dissipater 25. Instead of this beater-dissipater 25 an impact-dissipater could also be used. The passage E1 is supplied with tailings from the plan sifters 12 P2 and 12 P3 which are not always clean, that is to say there is still some bran sticking thereto. The passage E2 is supplied from the plan sifter 12 E1. In addition to the desired product, feedstuffmeal and fine bran are also taken from the plan sifter 12 E2. A proportion of the product from the plan sifter 12 E2 is also finish processed on a turbo screen 29, and again feedstuffmeal and fine bran are obtained. The passage E2 could be provided with a pair of fine-fluted rollers.

Owing to the high pressure and the considerable speed ratio of the pairs of smooth rollers 27 E1 and 27 E2 the grinding effect in these stages is no longer gentle, but on the other hand, it concerns only a small residue of the products, about 4–8% of the weight of the initial wheat. This final reduction group makes it possible to end the milling operation without great mechanical outlay.

For further processing, the product 41 from the bin 15 is continuously suspended in water and/or process water 42, in a premixer 43, in the ratio 1:1.2–2.0 depending on the quality of the product. The suspension is fed in this way to a mixer 44 in which the product is dispersed in water to form a homogeneous dispersion. This is then separated in a centrifuge 45 into a heavy fraction rich in starch and a light fraction rich in gluten. The heavy fraction containing A-starch is washed with water at 47, after which the purified A-starch is fed to a drier 48. The process water 49 is returned into the processing cycle.

The light fraction rich in gluten, the temperature of which has been increased to a suitable extent by means of process water or a heat exchanger, is pumped into a rest tank 50 and from there passed on, with the addition of process water 52, to a mixer 51 in which the gluten, which formed thread-like accumulations in the rest tank 50, is, owing to the action of the mixer vanes, separated from the water phase, i.e., the starch milk, which contains the lower-quality starch (B) and other solids and soluble constituents of the flour. The gluten is separated in the form of large agglomerated accumulations. The mixture of the gluten accumulations and the starch milk is fed continuously to a separator 53 into a centrifuge 55 in which the lower-quality starch (B) and the other solid constituents are separated from the water phase and pumped into a drier 56. A proportion of the process water 57, which contains the soluble constituents of the flour, is returned into the processing cycle, and the residue is discharged as waste.

The invention will be explained in detail with the help of the following example:

EXAMPLE

Figure 2:
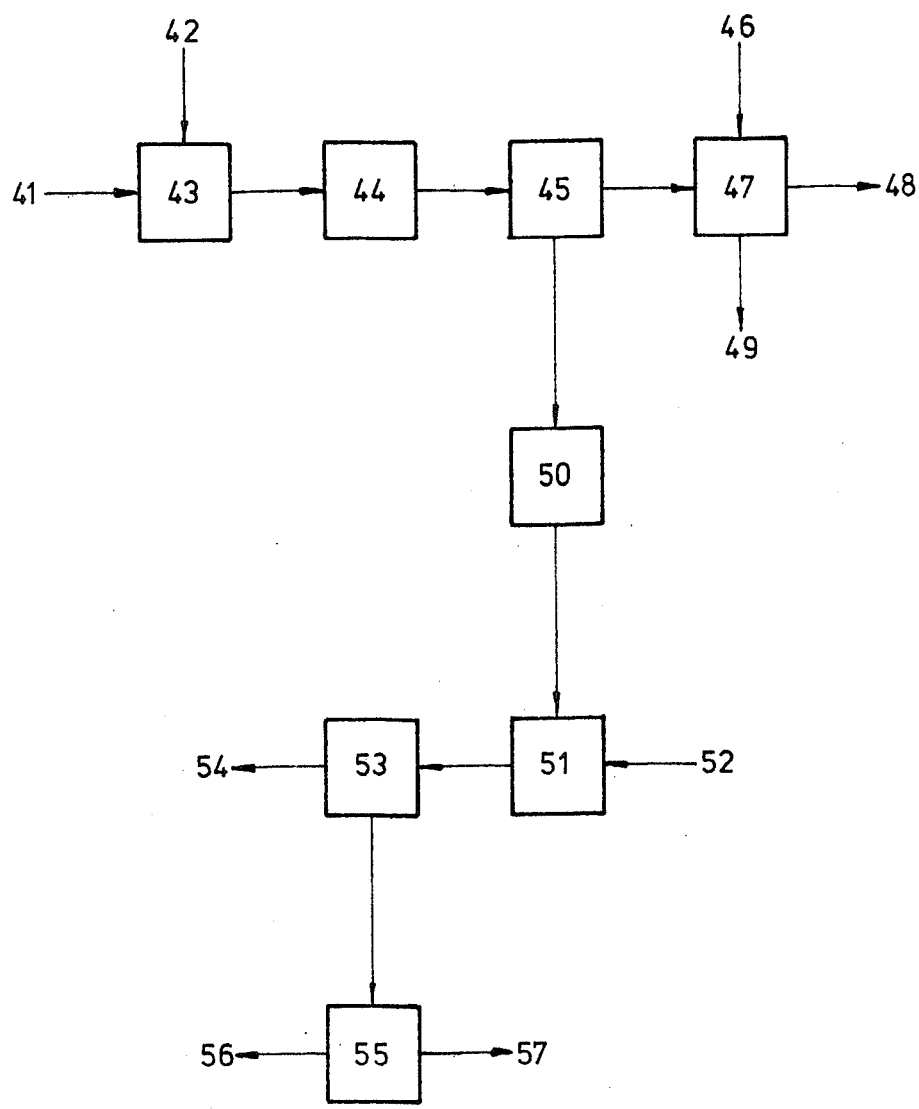
FIG. 2 the installation for separating starch and gluten

Semi-hard Finnish winter wheat was ground in a mill in accordance with the foregoing description and then processed in a test plant arranged as shown in the diagram of FIG. 2 to obtain starch and gluten.

In the plant shown in FIG. 2, the product was processed continuously with a throughput of 110 kg per hour. The temperature of the (suspension) water 42 was adjusted so that the temperature of the protein concentrate, i.e., the light fraction rich in gluten, amounted to about 40° C behind the separating centrifuge 45. The dwell time in the rest tank 50 amounted to 30 minutes.

For comparison, semi-hard Finnish winter wheat was ground in the usual way also and then processed in the aforesaid experimental plant to obtain starch and gluten.

The results of these tests are listed in the following table. In the table, starch A means the higher-quality starch and starch B is the lower-quality starch.

TABLE I

| Product | Dry yield in percent on the basis of the dry endosperm product | Protein content on dry basis % |
|---|---|---|
| With endosperm product, ground by the method proposed by the present invention. | | |
| Starch A | 64.6 | 0.45 |
| Starch B | 16.6 | 8.7 |
| A + B | 81.2 | |
| Gluten | 14.6 | 81.2 |
| Waste | 4.2 | |
| With flour ground in the usual way | | |
| Starch A | 59.4 | 0.50 |
| Starch B | 21.1 | 6.6 |
| A + B | 80.5 | |
| Gluten | 14.4 | 80.8 |
| Waste | 5.1 | |

This shows that the yield in A-starch and the quality of the starch were both improved. The total starch yield was also increased to some extent. Gluten was obtained in a somewhat greater quantity and was of a higher degree of purity. The waste decreased slightly. All this results in an improvement in the economic aspect of the method mentioned initially.

What is claimed is:

1. In the method of producing starch and gluten from a grain such as wheat, rye or barley, comprising the steps of dispersing endosperm fractions derived through the grain milling process in water, separating the dispersion into a starch-rich fraction and a gluten-rich fraction by centifugation, maintaining the gluten-rich fraction at an elevated temperature level for a predetermined period of time to allow the gluten to form filiform agglomerates, adding water to the agglomerate-containing fluid to expand the size of the agglomerate, and separating the gluten accumulation from the resultant mixture, the improvement comprising the additional step of initially grinding the grain to obtain the endosperm fractions by the method comprising the steps of:

(a) breaking and sifting the grain to obtain finished endosperm fractions, a fine product, a coarse product, and a bran waste product;

(b) sizing the coarse product by cutting and sifting to produce finished endosperm fractions and a sized product;

(c) pressing, impacting, and softing the sized product and the fine product to produce finished endosperm fractions and tailings; and (d) finally reducing the tailings to produce finished endosperm fractions and a fine bran waste product.

2. A method of producing starch and gluten from wheat, rye, or barley endosperm fractions dispersed in water, the dispersion then being separated by centrifuging into a heavy fraction rich in starch and a light fraction right in gluten, the light fraction being kept at an elevated temperature sufficiently long for the gluten to form filiform agglomerates, said agglomerates then being increased in size by the addition of water and intensive treatment of the liquid mixture, comprising the preliminary step of grinding said wheat, rye or barley in a mill having a plurality of passages, each of which comprises at least one pair of rollers and a sifting unit, by breaking the wheat, rye or barley in a break system having a plurality of passages; sizing the semolinas from the break system in passages having fluted rollers; grinding the sized product and the fine products of the break passages in pressing and impacting passages, each of said pressing and impacting passages having a smooth roller pair comprising a fast and a slow roller with a small speed ratio between the fast roller and the slow roller, and a dissipator; and subjecting the products which are not yet finished from said pressing and impacting passages to final reduction in a small number of final reduction passages using rollers.

3. The process according to claim 2 wherein the product obtained at each passage is passed through sieving cloths having the same mesh aperture in each case.

4. The process according to claim 2, including the additional step of sifting the products from the break system with grading plan sifters.

5. The process according to claim 2, including the additional step of separating the products from the break system with brushing machines.

6. The process according to claim 2, including the additional step of separating the products from the break system with bran centrifuges.

7. The process according to claim 2, wherein said dissipator is an impact dissipator.

8. The process according to claim 2, wherein said dissipator is a beater dissipator.

9. The process according to claim 2, wherein said rollers in said final reduction passages are smooth rollers.

10. The process according to claim 2, wherein said rollers in said final reduction passages are fine-fluted rollers.

11. A mill for deriving endosperm fractions comprising:
   (a) a break stage having a plurality of break passages related in series, each break passage including at least one pair of opposed, fluted rollers;
   (b) a sizing stage having a plurality of sizing passages related in a series, each sizing passage including at least one pair of opposed, fluted rollers;
   (c) means for sorting finished endosperm fractions from predetermined coarseness grades of product in the break stage and conveying predetermined coarseness grades of product to the sizing stage;
   (d) a pressing and impacting stage having a plurality of pressing and impacting passages related in a series, each passage including at least one pair of opposed, smooth rollers, and a dissipater;
   (e) means for sorting finished endosperm fractions from predetermined coarseness grades of product in the sizing stage and conveying predetermined coarseness grades of product to the pressing and impacting stage;
   (f) a final reduction stage having a plurality of reducing passages related in series, each reducing passage including at least one pair of opposed rollers; and
   (g) means for sorting finished endosperm fractions from predetermined coarseness grades of product in the pressing and impacting stage and conveying predetermined coarseness grades of product to the final reduction stage.

12. The mill of claim 11 wherein the final reduction stage comprises at least one pair of smooth, opposed rollers, at least one pair of fluted, opposed rollers, and at least one dissipater.

13. The mill of claim 11 wherein each pair of rollers in the recited stages comprises a fast roller and a slow roller, and wherein:
   (a) the roller speed ratio in the sizing stage is within the range of 1:1.3 to 1:1.8;
   (b) the roller speed ratio in the pressing and impacting stage is within the range of 1:1.00 to 1:1.20; and
   (c) the roller speed ratio in the final reduction stage is within the range of 1:1.2 to 1:1.4.

14. The mill of claim 13 which further comprises final sieving cloths each having the same mesh aperture, disposed in each said passage.

15. The mill of claim 13 which further comprises a bran cleaning stage for cleaning bran derived in the break stage to a finished product, said cleaning stage comprising a plurality of bran brushes connected in series, and means for sorting and conveying the bran waste from the break stage to the bran cleaning stage.

16. The mill of claim 15 wherein the bran cleaning stage comprises a plurality of bran centrifuges connected in series.

17. A mill for grinding raw wheat, rye, or barley to produce endosperm fractions, comprising a break system and a reduction system, each of said systems including a plurality of passages, each passage having at least one pair of rollers and a sifting unit, and wherein said pairs of rollers of said break system are fluted and each pair comprises a slow roller and a fast roller;
   and wherein said reduction system comprises three groups of passages arranged in series, including a sizing group whose passages are provided with pairs of fluted rollers for semolina reduction with a speed ratio which is in the range between 1:1.3 and 1:1.8; a pressing and impacting group whose passages are provided with pairs of smooth rollers whose speed ratio is in the range between 1:1.0 and 1:1.2 with a dissipater being arranged in each case between the pair of rollers and the sifting unit; and a final reduction group whose passages are provided with pairs of rollers whose speed ratio is in the range between 1:1.2 and 1:1.4.

18. The apparatus of claim 17 wherein a dissipator is provided in at least one of said passages of said final reduction group.

19. The apparatus of claim 17 wherein the dissipater is an impact dissipater.

20. The apparatus of claim 17 wherein the dissipater is a beater dissipater.

21. The apparatus of claim 17 wherein the rollers in the final reduction group are smooth rollers.

22. The apparatus of claim 17 wherein the rollers in the final reduction group are fine-fluted rollers.

* * * * *